No. 896,493. PATENTED AUG. 18, 1908.
H. J. WALZ & J. W. BUTLER.
EGG STRAINER.
APPLICATION FILED MAY 23, 1907.

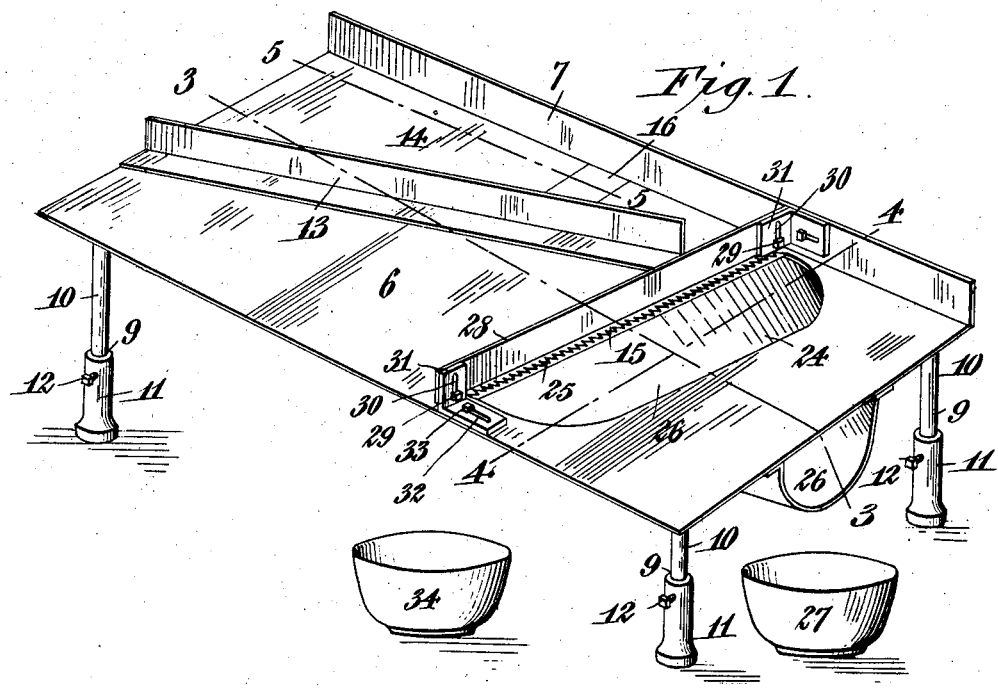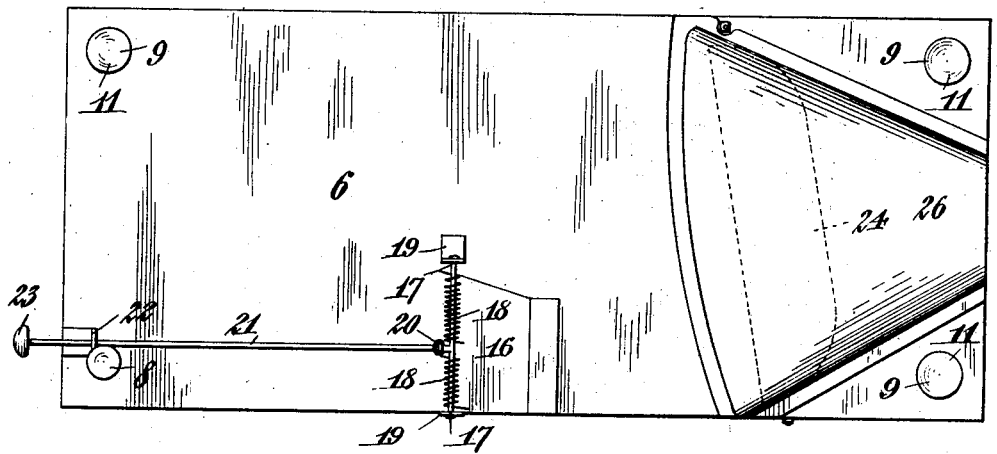

2 SHEETS—SHEET 2.

Witnesses:
Christ Feinle.
Harry D. Rapp.

Jay W. Butler
Henry J. Walz } Inventors
By Emil Neuhart,
Attorney

UNITED STATES PATENT OFFICE.

HENRY J. WALZ, OF BUFFALO, AND JAY W. BUTLER, OF HERMITAGE, NEW YORK.

EGG-STRAINER.

No. 896,493.  Specification of Letters Patent.  Patented Aug. 18, 1908.

Application filed May 23, 1907. Serial No. 375,375.

*To all whom it may concern:*

Be it known that we, HENRY J. WALZ and JAY W. BUTLER, citizens of the United States, residing, respectively, at Buffalo, in the county of Erie and State of New York, and at Hermitage, in the county of Wyoming and State of New York, have invented certain new and useful Improvements in Egg-Strainers; and we do hereby declare the following to be a full, clear, and exact description of the invention, such as will enable others skilled in the art to which it appertains to make and use the same.

One object of our invention is the production of an inexpensive and effective egg-separator in which provision is made to discharge bad eggs from the device, and also eggs having their yolks broken previous to reaching the point where the white of the egg is strained or separated from the yolk.

Another object is to provide effective means for straining the white of an egg from the yolk thereof, and to provide an adjustable guide-plate for the yolks of the eggs, between which and a series of saw-teeth the white of the eggs pass.

Still further objects are to provide for adjusting the incline of the runways so that eggs will move freely and the whites and the yolks be deposited in separate receptacles, and to otherwise improve on egg-separators now in use.

With these objects in view, the invention consists of a flat table of oblong formation having a longitudinal runway leading to the egg-straining device, and having a spring controlled gate or similar device through which bad eggs or eggs with broken yolks may be passed as they move toward the egg-straining device.

It also consists in an inclined longitudinally disposed runway and an inclined transverse runway having the egg-straining device adjacent thereto, so that when the eggs are moved along the transverse runway the whites of the eggs are separated from the yolks.

It further consists in providing the runway with a longitudinal series of teeth over which the whites of the eggs are to pass, and in a plate adjustable toward and from said teeth; and also in a supporting-plate having adjustable legs, whereby said plate can be inclined both laterally and longitudinally to provide the desired inclination for the runways.

The invention also consists in the construction, arrangement and combination of parts to be hereinafter described and particularly pointed out in the appended claims.

Figure 3:
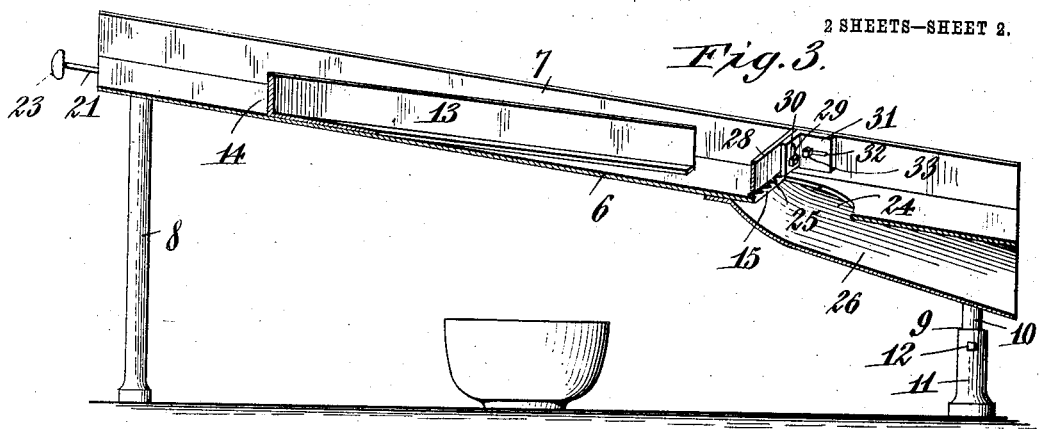
Figure 4:
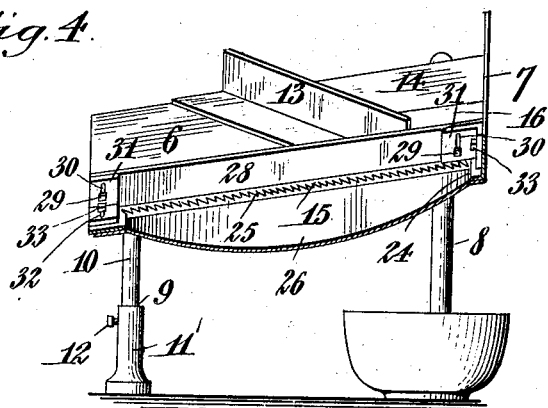
Figure 5:
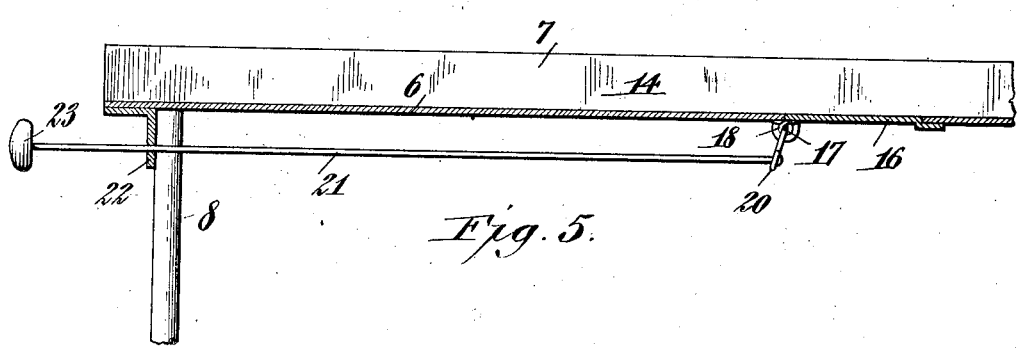

In the drawings,—Figure 1 is a perspective view of the device. Fig. 2 is a bottom plan view of the same. Fig. 3 is a longitudinal section taken on line 3—3, Fig. 1. Fig. 4 is a transverse section taken on line 4—4, Fig. 1. Fig. 5 is an enlarged longitudinal section taken on line 5—5, Fig. 1.

Referring to the drawings in detail, like numerals of reference refer to like parts in the several figures.

The numeral 6 designates an inclined receiving table which may be made in the form of a plate having an upstanding flange 7 along one side edge; said table or support being preferably oblong and supported at its four corners by legs 8 and 9. The leg designated 8 may have a fixed length, while the legs designated 9 are adjustable; each of said adjustable legs comprising a rod 10 secured to the table or support, and a tubular member 11 into which the lower end of said rod enters; the proper length being given to each leg by inserting the rod thereof to the desired extent into its co-acting tube, said rods being fastened by means of set-screws 12. The leg 8 having a fixed length is located at that corner of the support or table having highest elevation. The adjustable leg 9 at the transversely opposite corner of the table being adjusted to a slightly shorter length so that the table is inclined transversely from the leg 8 to said adjustable leg. The adjustable leg 9 at the opposite end of the table or support and on the same side as the leg 8, is adjustable to a shorter length than the adjustable leg at the opposite end of the table, and the adjustable leg 9 diagonally opposite the leg 8 is adjusted to a shorter length than the other legs, and therefore the table at this point is given the lowest elevation. By adjusting the legs in this manner the table or support is inclined both longitudinally and transversely.

Arranged longitudinally on the table or support and at a slight angle to the flange 7, is a wall 13 forming a runway 14 for the eggs, which is gradually restricted from one end of the table to a point a short distance from the egg-straining device 15. The widest portion of this runway provides for conveniently depositing the eggs therein, and near the opposite end of the runway is a gate 16, which is hinged as at 17, and maintained in a closed position by springs 18; the gate being pivoted in brackets 19 secured to the table or support, and having a depending arm 20 to which is connected a rod 21 guided in a bracket 22 on the table or support, and having a head or enlargement 23 at its outer end for conveniently manipulating the same to cause the said gate to be opened. The latter when closed is flush with and forms a part of the runway 14 so as not to form an obstruction to the free passage of eggs through said runway.

The egg-straining device 15 is preferably formed by cutting an opening 24 in the table or support and forming a longitudinal series of teeth 25 extending along one edge of said opening; said teeth being bent upward and similar to saw-teeth and lying in the plane of the receiving table; and beneath the opening 24 is a chute or runway 26. The toothed edge of the opening 24 is arranged a short distance from the restricted end of the egg runway 14 and is arranged at a slight angle to the end edge of the table. As the eggs leave the runway 14 and approach the toothed edge of the opening, the whites of the eggs pass over the teeth 25 and enter the chute or runway 26, from the lower or outer end of which they are deposited into a suitable receptacle, such as shown at 27.

In order to prevent the yolks of the eggs coming in contact with the teeth, a combined guard and guide-plate 28 is provided, which is arranged above the teeth 25 and slightly back of the same; this plate being vertically adjustable toward and from the teeth, which adjustment is effected by bolts or screws 29 passing through slots 30 in brackets 31. The guard and guide plate 28 is adjustable laterally by means of horizontal slots 32 formed in the brackets 31, these slots being engaged by bolts 33 attached to the table or support 6. By adjusting these brackets, the combined guide and guard-plate 28 carried thereby, may be adjusted with respect to the teeth 25.

The eggs as they come in contact with the egg-straining device, consisting of the guide and guard-plate 28 and the series of teeth 25, are separated by the whites thereof passing over said teeth and the yolks sliding along the guide-plate 28 toward the side edge of the table, over which they pass and drop into a suitable receptacle, such as 34. As the eggs slide along the guide-plate 28, the teeth 25 serve to separate the whites of the eggs from the yolks, and owing to the slimy nature of the whites, the white part having passed over the toothed edge tends to draw said part remaining on the table into the chute or runway 26. If a bad egg, or an egg with a broken yolk, is deposited on the run-way, the operator by drawing the rod 21 forward by means of the knob 23 drops the free end of the trap door 16 and permits the bad or broken egg to fall into a receptacle arranged beneath said trap door, thereby preventing said bad or broken egg from coming in contact with the teeth 25, or from being deposited into the receptacle designed for the yolk, or the whites of the eggs.

This device can be cheaply constructed as it is principally formed of sheet metal so that the parts thereof can be easily stamped. The arrangement of the supporting legs thereof, while not essential, provides a convenient means of inclining the table or support to the extent desired. The table may be inclined and supported in any other desired manner, it being only necessary to provide sufficient elevation to deposit the whites and yolks of the eggs in suitable receptacles.

Having thus described our invention, what we claim is,

1. An egg-strainer comprising a table or support having a longitudinal runway and a transverse runway at one end of said longitudinal runway, said transverse runway having a longitudinal series of teeth over which the whites of the eggs pass and a guard-plate along which the yolks of the eggs move, said guard-plate serving to prevent the yolks from coming in contact with said teeth.

2. An egg-strainer comprising a table or support having a runway arranged lengthwise thereon, a spring-controlled gate in said runway and forming a part thereof, a straining device at the end of said runway, and adjustable legs whereby the table or support may be inclined to provide the desired inclination for said runway.

3. An egg separator, comprising an inclined receiving table provided with a runway, a series of teeth lying in the plane of said run-way and extending transversely thereof, and a guard extending transversely of said run-way back of said teeth.

4. An egg separator comprising an inclined receiving table provided with a runway, and a series of teeth lying in the plane of said run-way and extending transversely thereof, and a vertically adjustable guard arranged above said teeth.

5. An egg strainer comprising an inclined receiving table having a run-way, a series of teeth lying in the plane of said table and arranged transversely of said run-way, a guard extending back of said teeth, and forming with said table a transverse run-way adjacent to and in line with said teeth and guard.

In testimony whereof, we have affixed our signatures in the presence of two subscribing witnesses.

HENRY J. WALZ.
JAY W. BUTLER.

Witnesses:
ELLA C. PLUECKHAHN,
EMIL NEUHART.